US010066508B2

(12) United States Patent
Geiger

(10) Patent No.: US 10,066,508 B2
(45) Date of Patent: Sep. 4, 2018

(54) METHOD FOR PRODUCING, REPAIRING AND/OR EXCHANGING A HOUSING, IN PARTICULAR AN ENGINE HOUSING, AND A CORRESPONDING HOUSING

(75) Inventor: Peter Geiger, Munich (DE)

(73) Assignee: MTU AERO ENGINES AG, Munich (DE)

( * ) Notice: Subject to any disclaimer, the term of this patent is extended or adjusted under 35 U.S.C. 154(b) by 627 days.

(21) Appl. No.: 14/233,817

(22) PCT Filed: Jul. 25, 2012

(86) PCT No.: PCT/DE2012/000748
§ 371 (c)(1),
(2), (4) Date: Jan. 20, 2014

(87) PCT Pub. No.: WO2013/017118
PCT Pub. Date: Feb. 7, 2013

(65) Prior Publication Data
US 2014/0161601 A1  Jun. 12, 2014

(30) Foreign Application Priority Data

Jul. 29, 2011 (DE) .......................... 10 2011 108 957

(51) Int. Cl.
*F01D 25/24* (2006.01)
*F01D 5/00* (2006.01)
(Continued)

(52) U.S. Cl.
CPC ............ *F01D 25/24* (2013.01); *F01D 5/005* (2013.01); *F01D 21/045* (2013.01); *F01D 25/26* (2013.01);
(Continued)

(58) Field of Classification Search
CPC ........ F01D 25/24; F01D 21/045; F01D 25/26; F01D 5/005; F05D 2230/30; F05D 2230/31
(Continued)

(56) References Cited

U.S. PATENT DOCUMENTS 4,902,201 A * 2/1990 Neubert ................ F01D 21/045
138/110
5,041,323 A * 8/1991 Rose ......................... B32B 3/12
181/292
(Continued)

FOREIGN PATENT DOCUMENTS

DE  102004042775 A1 *  3/2006  .............. B22F 3/008
DE  102005025199 A1 * 12/2006  ............ B22F 3/1055
(Continued)

OTHER PUBLICATIONS

Evans, K. E., "Auxetic polymers: a new range of materials" Endeavour, New Series, vol. 15, No. 4, Jan. 1, 1991 (Jan. 1, 1991), pp. 170-174, XP055001332, ISSN: 0160-9327, 1991 Pergamon Press, pic.
(Continued)

*Primary Examiner* — Jason Newton
(74) *Attorney, Agent, or Firm* — Barlow, Josephs & Holmes, Ltd.

(57) ABSTRACT

The invention relates to a method for producing, repairing and/or exchanging a housing, in particular an engine housing of an aircraft engine, comprising at least two shells, between which a structural part is formed, wherein the method comprises the following step: layer-by-layer construction of the at least two shells jointly with the structural part by means of a generative manufacturing system, wherein the structural part comprises at least one porous
(Continued)

structure and/or honeycomb structure. The invention relates furthermore to such a housing.

26 Claims, 4 Drawing Sheets

(51) Int. Cl.
*F01D 21/04* (2006.01)
*F01D 25/26* (2006.01)

(52) U.S. Cl.
CPC ......... *F05D 2230/22* (2013.01); *Y02T 50/672* (2013.01); *Y10T 29/4973* (2015.01)

(58) Field of Classification Search
USPC ........................................................ 415/200
See application file for complete search history.

(56) References Cited

U.S. PATENT DOCUMENTS

| | | | | |
|---|---|---|---|---|
| 5,160,248 | A * | 11/1992 | Clarke | F01D 21/045 156/276 |
| 5,340,656 | A * | 8/1994 | Sachs | B05C 19/04 347/1 |
| 5,447,411 | A * | 9/1995 | Curley | F01D 21/045 156/292 |
| 5,593,531 | A * | 1/1997 | Penn | B29C 67/0074 156/272.6 |
| 5,902,441 | A * | 5/1999 | Bredt | B28B 1/00 156/284 |
| 6,005,219 | A * | 12/1999 | Rockstroh | C21D 10/005 148/525 |
| 6,159,619 | A * | 12/2000 | Rockstroh | C21D 10/005 148/565 |
| 6,193,923 | B1 * | 2/2001 | Leyden | B29C 41/12 264/308 |
| 6,575,694 | B1 * | 6/2003 | Thompson | F01D 21/045 415/173.4 |
| 6,652,222 | B1 * | 11/2003 | Wojtyczka | B32B 3/12 415/200 |
| 6,767,499 | B1 * | 7/2004 | Hory | B22F 3/1055 264/497 |
| 7,160,621 | B2 * | 1/2007 | Chaudhari | B60R 19/18 293/120 |
| 7,951,324 | B2 * | 5/2011 | Naruse | C04B 35/565 264/630 |
| 8,691,329 | B2 * | 4/2014 | Qi | B22F 3/1055 427/142 |
| 9,314,844 | B2 * | 4/2016 | Geiger | B22F 3/1055 |
| 9,505,176 | B2 * | 11/2016 | Ederer | B22F 1/0059 |
| 9,903,207 | B2 * | 2/2018 | Tozzi | F01D 5/18 |
| 2002/0164244 | A1 | 11/2002 | Sathianathan et al. | |
| 2003/0156940 | A1 * | 8/2003 | Czachor | F01D 21/045 415/119 |
| 2004/0022625 | A1 * | 2/2004 | Care | F01D 11/122 415/173.3 |
| 2004/0141837 | A1 * | 7/2004 | McMillan | F01D 21/045 415/173.3 |
| 2004/0187714 | A1 * | 9/2004 | Napadensky | B29C 41/48 101/35 |
| 2006/0140767 | A1 * | 6/2006 | Garman | B22F 3/105 416/182 |
| 2008/0014457 | A1 * | 1/2008 | Gennaro | B22F 3/1055 428/546 |
| 2008/0075618 | A1 * | 3/2008 | Martin | B22F 3/1055 419/6 |
| 2008/0286099 | A1 * | 11/2008 | Rao K V | F01D 25/26 415/213.1 |
| 2008/0290215 | A1 * | 11/2008 | Udall | F01D 5/147 244/123.14 |
| 2009/0096687 | A1 * | 4/2009 | Gentilman | B28B 1/00 343/705 |
| 2009/0304497 | A1 * | 12/2009 | Meier | F01D 11/001 415/170.1 |
| 2010/0275572 | A1 * | 11/2010 | Durocher | F01D 9/065 60/39.08 |
| 2011/0059291 | A1 * | 3/2011 | Boyce | C08J 5/00 428/136 |
| 2011/0064909 | A1 * | 3/2011 | Alderson | C08J 5/04 428/114 |
| 2011/0085900 | A1 * | 4/2011 | Schutz | F01D 9/06 415/202 |
| 2012/0018926 | A1 * | 1/2012 | Mannella | B29C 67/0077 264/500 |
| 2012/0082541 | A1 * | 4/2012 | Macchia | F01D 21/045 415/200 |
| 2012/0266439 | A1 * | 10/2012 | Geiger | B22F 3/1055 29/428 |
| 2012/0315456 | A1 * | 12/2012 | Scarpa | F16F 3/093 428/221 |
| 2013/0001837 | A1 * | 1/2013 | Gohler | B22F 3/1055 264/497 |
| 2013/0195671 | A1 * | 8/2013 | El-Wardany | F01D 5/286 416/229 R |
| 2013/0316183 | A1 * | 11/2013 | Kulkarni, Jr. | B23P 6/007 428/557 |
| 2014/0065343 | A1 * | 3/2014 | Hess | B22F 3/1055 428/63 |
| 2014/0161624 | A1 * | 6/2014 | Bayer | F01D 21/006 416/241 R |
| 2015/0196971 | A1 * | 7/2015 | Schneider | B29D 99/0025 219/76.14 |
| 2015/0275687 | A1 * | 10/2015 | Bruck | B23P 6/007 277/345 |
| 2015/0345320 | A1 * | 12/2015 | Webb | F01D 25/24 415/196 |
| 2016/0123160 | A1 * | 5/2016 | Strock | F01D 5/288 428/116 |
| 2016/0159488 | A1 * | 6/2016 | Roach | B29D 22/00 416/245 R |
| 2017/0328207 | A1 * | 11/2017 | Bunker | F01D 5/147 |

FOREIGN PATENT DOCUMENTS

| | | | | |
|---|---|---|---|---|
| DE | 102006049216 A1 * | 4/2008 | ............ | B22F 3/1055 |
| DE | 102006049218 A1 | 4/2008 | | |
| DE | 102008015342 A1 | 9/2008 | | |
| DE | 102008002847 A1 | 11/2008 | | |
| DE | 102010049068 A1 * | 4/2012 | ............ | B22F 3/1055 |
| EP | 1878873 A2 | 1/2008 | | |
| FR | 2875850 A1 | 3/2006 | | |
| WO | WO 2008046386 A1 * | 4/2008 | ............ | B22F 3/1055 |
| WO | WO 2013124314 A1 * | 8/2013 | ............ | F04D 29/023 |

OTHER PUBLICATIONS

Stott, P. J. et al., "A growth industry", Materials World, The Institute of Materials, London, GB, No. 8, Oct. 1, 2000 (Oct. 1, 2000), pp. 12-14, XP008024964, ISSN: 0967-8638.

* cited by examiner

METHOD FOR PRODUCING, REPAIRING AND/OR EXCHANGING A HOUSING, IN PARTICULAR AN ENGINE HOUSING, AND A CORRESPONDING HOUSING

BACKGROUND OF THE INVENTION

The present invention relates to a method for producing or forming, repairing and/or exchanging a housing, in particular an engine housing, as well as such a housing.

A gas turbine is known from EP 1 878 873 A2. Rotating blades are disposed in the housing of such a gas turbine. If such a rotating blade breaks, then the broken blade must be prevented from breaking through the housing.

Therefore, such housings have previously been formed with correspondingly thick walls, in order to prevent the blade from breaking through the housing. This has the disadvantage, however, that it results in a correspondingly heavy weight of the housing. In addition, if it is utilized in a very hot region, for example, such a housing cannot be insulated by placement of fiber fabric, so that here also the wall of the housing must be made correspondingly thicker and the weight of the housing is increased considerably.

BRIEF SUMMARY OF THE INVENTION

The object of the invention is now based on providing an improved housing, as well as a method for producing or forming, repairing and/or exchanging the housing.

According to the invention, a method is now provided for forming, for repairing and/or for exchanging a housing with at least two shell parts and a structural part disposed in between, as well as such a housing.

More precisely stated, a method is provided for producing, repairing and/or exchanging a housing, in particular, an engine housing of an aircraft engine, having at least two shell parts, between which a structural part is formed, wherein the method comprises the following step:

Layer-by-layer construction of the at least two shell parts together with the structural part by means of a generative manufacturing method, wherein the structural part has at least one porous structure and/or one honeycomb structure.

In addition, a housing is provided, in particular an engine housing, having at least two shell parts and a structural part formed between the shell parts, wherein the housing is produced by a generative manufacturing method and the structural part has at least one porous structure and/or one honeycomb structure.

The method and the housing have the advantage that a housing can be provided, which has a structural part with one porous structure and/or one honeycomb structure, for heat insulation and damping as well as for increasing the resistance to break-through of the housing. The structural part also has the advantage that the weight of the housing can be reduced and, in particular, can also be utilized in very hot regions, e.g., in the back part of an aircraft engine. This is not possible with conventional insulation materials, such as fiber fabrics, for example, as have been previously utilized for insulating a housing.

Advantageous embodiments and enhancements of the invention are taken from the subclaims as well as the description with reference to the drawings.

In one embodiment of the invention, there is a layer-by-layer construction of a support structure by means of the generative manufacturing method and a subsequent formation of the housing onto the support structure by means of the generative manufacturing method and a removal of the support structure after finishing the housing. The support structure has the advantage that the housing itself need not be constructed directly onto the support or the base plate.

In another embodiment, there is the forming of at least one shell part as a shell part having solid walls.

According to another embodiment according to the invention, the porous structure and/or honeycomb structure is formed as an auxetic structure or as a non-auxetic structure. In this case, for example, the porous structure is a foam structure. An auxetic structure has the advantage that the damping properties of the housing can be improved thereby and the rigidity of the housing can be influenced in a targeted manner. In addition, the heat insulation of the housing can be improved, as it is also by a non-auxetic structure.

In another embodiment, the auxetic structure is preferably aligned in the direction of a principal load of the housing. An improved containment or shielding of the housing against an unwanted break-through of broken rotating parts through the housing can be achieved thereby.

In another embodiment of the invention, the housing is formed with at least one intermediate shell part between the outer shell part and the inner shell part, a structural part being formed between the inner shell part and the intermediate shell part, and a structural part being formed between the intermediate shell part and the outer shell part. In this way, one structural part can be provided particularly for heat insulation, whereas the other structural part can be provided particularly for improving the containment or break-through protection of the housing. Such a housing has the advantage that it is much lighter than a corresponding conventional housing that previously needed to be formed with appropriately thick walls in order to achieve break-through protection.

BRIEF DESCRIPTION OF THE DRAWINGS

The invention will be explained in more detail below based on the embodiment examples indicated in the schematic figures of the drawing. Here.

DETAILED DESCRIPTION OF THE INVENTION

In the figures, the same elements or similar elements are provided with the same reference numbers, insofar as nothing is stated to the contrary.

Figure 1:
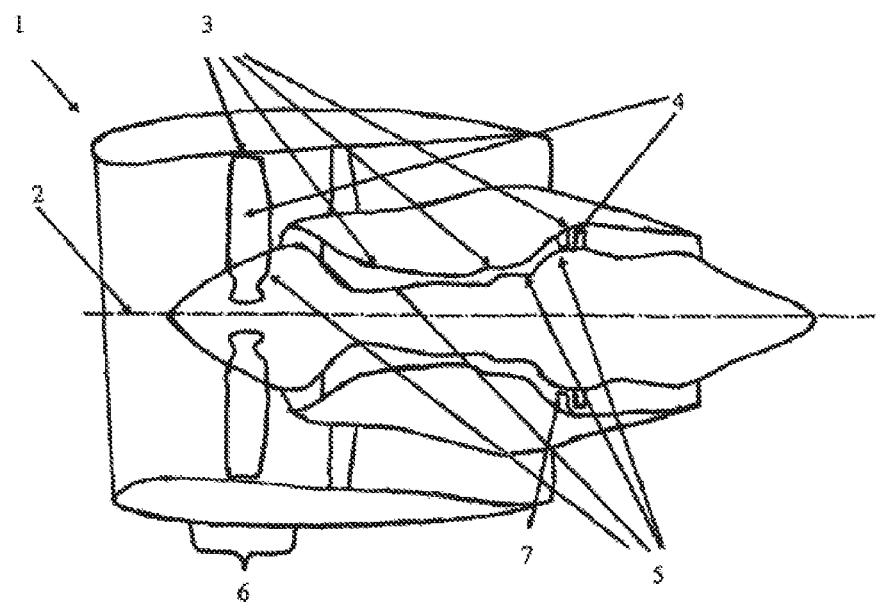
FIG. 1 shows a sectional view of an aircraft engine in which a housing according to the invention can be utilized.

An aircraft engine 1 is shown in a sectional view in FIG. 1, as an example of a component having a housing 3, in which rotating parts are disposed. The housing 3 here is formed for collecting the rotating parts in the case when these parts become detached or break off in an undesired manner and fly off.

Such engines 1 or turbomachines contain structural elements, such as rotating blades 4, for example which rotate at partly very high rpms around an axis of rotation 2 in the housing and are subjected to correspondingly high centrifugal forces. If these rotating structural elements become detached or break, then they fly outwardly at very high rotational energy. In this case, for example, in order not to endanger the aircraft to which the engine belongs, the housings 3, which enclose the rotating structural elements, must be designed so that these rotating broken-off or detached structural elements are held in by these housing structures and do not reach outside them. One thus speaks of containment.

Additionally, other structural elements, such as blade elements, e.g., guide vanes 7 in the case of the engine 1 shown in FIG. 1, can also be fastened to the housing 3. These guide vanes are fixed to the inside of the housing 3, whereby they are rigid and serve for reversing the flow. In this case, the guide vanes 7 can be formed in one piece with the housing 3 or are fastened separately to the housing 3. The different cross section of flow of the medium aspirated into the engine is provided with the reference number 5 in FIG. 1.

A classic shielding (containment) of the housing 3 against flying-off structural elements is achieved by corresponding dimensioning of the wall thickness of the housing 3. For this purpose, housings 3 are formed with correspondingly thick walls in order to collect rotating and detaching parts, such as, e.g., rotating blades 4. The thick walls, which are necessary in the component for this, however, lead to a clear increase in the weight of the housing 3, which is particularly undesirable in aircraft construction.

With new construction of engines 1, the rotational energies of broken-off or detached structural elements to be collected become increasingly greater, and thus the housings 3 also become essentially thicker and heavier, which brings serious disadvantages for the performance data of the engine 1 in the aircraft.

For example, fiber fabrics can be disposed around the housing 3 in the region of the fan 6. This method, however, cannot be used in the back region of the engine 1, since the temperatures there are too hot: i.e., in the prior art, one can be helped only by the classic thickening of the housing.

According to the present invention, a housing 3, in which rotating structural elements 8 are disposed, in particular, an engine housing 3 or an engine housing segment of an aircraft engine, is now formed by means of a generative manufacturing method, from at least two shell parts and a structural part disposed therebetween, which has at least one porous structure or one honeycomb structure, as is illustrated, for example, in FIG. 1, whereby the porous structure, such as a foam structure, for example, and/or the honeycomb structure, is formed as an auxetic structure or a non-auxetic structure. The structural part formed between the two shell parts is thus suitable, together with at least one of the shell parts, to collect a rotating structural element or a portion of a structural element that flies off, in such a way that the latter does not break through the housing.

Figure 2:
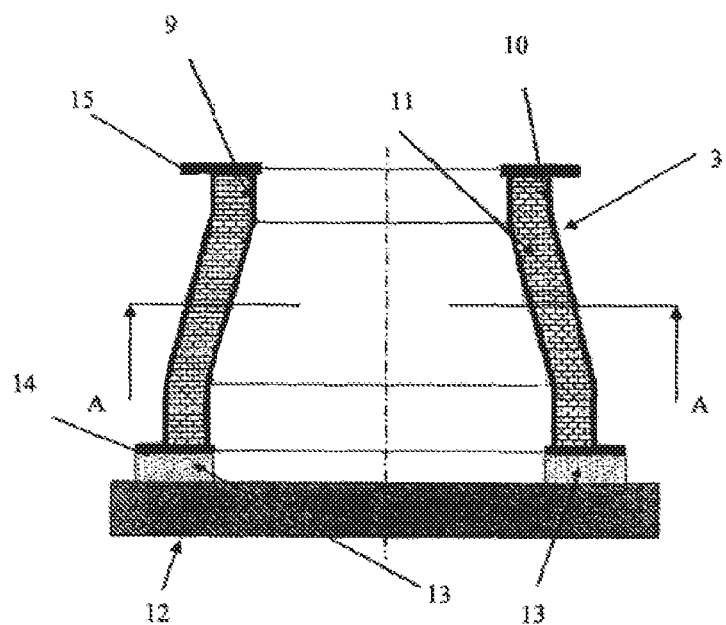
FIG. 2 shows a principle sketch of the production of a housing according to the invention.

A principle sketch of the production of a housing 3 according to the invention, e.g., a housing 3 of an aircraft engine 1, by means of a generative manufacturing method, is shown in FIG. 2. Later, one or more rotating structural elements, such as, e.g., rotating blades, are disposed in the housing 3, and these blades can be collected by means of the housing 3 if they should become detached or break off. The housing 3 is shown in a sectional view for better understanding in FIG. 2.

As described previously, the housing 3 has at least two shell parts 9, 10, an inner shell part 9 and an outer shell part 10, whereby a structural part 11 having at least one auxetic structure and/or one non-auxetic structure, such as, for example, an auxetic or non-auxetic honeycomb or foam structure, is formed between the two shell parts 9, 10.

The at least two shell parts 9, 10 and the structural part 11 disposed therebetween in this case are produced together in one part or integrally by means of a generative manufacturing method. The shell parts 9, 10 themselves are particularly formed solid in this case.

For example, so-called Rapid Manufacturing and so-called Rapid Prototyping are generative manufacturing methods. In generative manufacturing, components are particularly built up layer-by-layer by applying material. In this case, in the corresponding method, which is known, e.g., as laser sintering, selective laser sintering (SLS), electron beam sintering, electron beam melting (EBM), laser Cusing, selective laser melting (SLM), or 3D-printing, the material to be added or to be applied is processed in the form of powder. In this case, the powder is applied, e.g., layer-by-layer onto a base plate or a support. Subsequently, the powder layer is solidified by means of energy radiation, such as, e.g., a laser beam and/or an electron beam, in a component region, in order to form the component. The respective powder layer is usually solidified here based on geometrical data of the component being produced.

In this case, the region of the powder layer can be scanned, e.g., and the component region of the powder layer can be solidified by means of energy radiation. The powder in this region is melted or sintered by conducting the energy radiation.

Subsequently, the base plate or the support can be moved e.g., lowered by one layer thickness. A new powder layer is then applied thereon and again, the component region of the powder layer is solidified by means of energy radiation. In this way, the component can be built up layer by layer.

In the housing 3 according to the invention, for the formation of the two shell parts 9, 10 and the structural part 11 disposed therebetween, in particular, a metal powder made of at least one metal and/or a metal alloy, can be used as a powder, and introduced layer by layer onto a support 12, e.g., the base plate shown in FIG. 2. The respective powder layer is solidified in its component region by means of energy radiation from an energy radiation source, e.g., a laser or an electron beam source. The component region in this case comprises the region of the first shell part 9, the region of the second shell part 10, and the region of the structural part 11. Subsequently, the next powder layer is applied over the last selectively solidified powder layer, and the component region of this next powder layer is solidified in turn by means of the energy radiation from the energy radiation source, until, at the end, the solidified component regions form the finished housing 3 with its two shell parts 9, 10, and the structural part 11.

The two shell parts 9, 10 and/or the structural part 11 can be produced from the same material or material combination or from different materials or material combinations in the case of generative manufacturing methods. For example, for the generative manufacture of the housing 3, one of the shell parts 9, 10, e.g., the outer shell part 10, can be produced partially or completely from ceramics, and the other shell part and the structural part 11 can be produced from at least one metal and/or one metal alloy.

Such a housing 3 with a ceramic shell part as the outer shell part 10 can be formed, for example, as a turbine housing of an engine 1. The turbine housing forms a sub-component of the engine 1. Likewise, the structural part 11 can be formed from a metal and/or metal alloy other than that of one or both shell parts 9, 10 of the housing 3.

As is shown in the example of embodiment in FIG. 2, first an auxiliary structure 13 can be formed additionally by the generative manufacturing method, onto which subsequently the actual housing 3 with its two shell parts 9, 10 and the structural part 11 disposed therebetween is built up by the generative manufacturing method. The auxiliary structure 13 serves for the purpose of the housing 3 not being directly built up on the base plate or the support 12, but first a rougher auxiliary structure 13 is built up by the generative manufacturing method, onto which the actual housing 3 is then built up by the generative manufacturing method. The auxiliary structure 13 is removed again after finishing the housing 3.

As is shown in the embodiment of the housing 3 in FIG. 2, the shell parts 9, 10 are formed, for example, with additional lower and upper terminal parts 14, 15, so that the structural part 11 is completely covered on both ends by the terminal parts 14, 15, and thus the structural part 11 is completely enclosed on the ends by the two shell parts 9, 10 and the terminal parts 14, 15. One or both terminal parts 14, 15 may optionally be formed as a flange segment, for fastening to another component (not shown).

Figure 3:
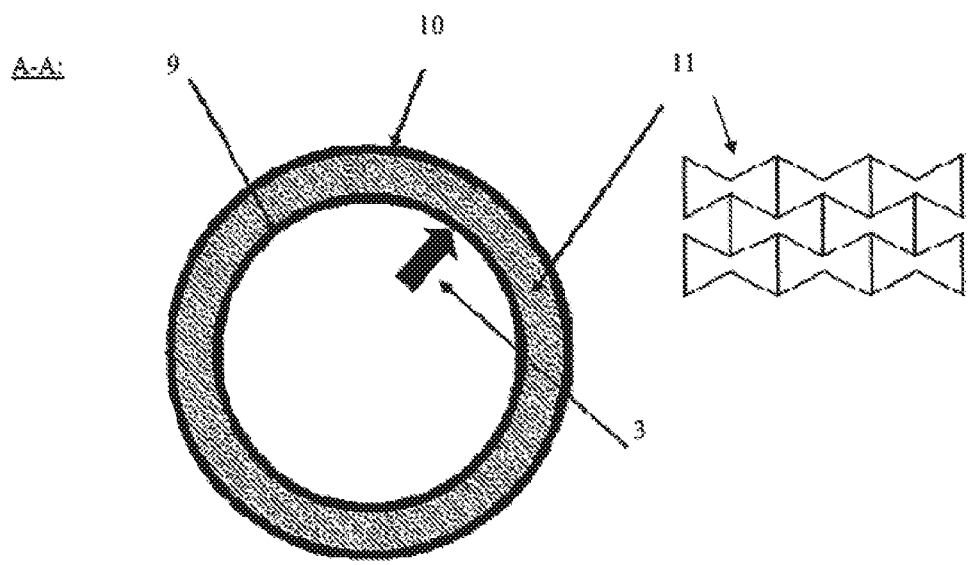
FIG. 3 shows a sectional view of the housing according to the invention according to FIG. 2.

A sectional view A-A of the housing 3 according to the invention according to FIG. 2 is shown in FIG. 3. In this case, the housing 3, as previously described, has an outer shell part and an inner shell part 9, 10, in particular a solid outer and a solid inner shell part 9, 10, a structural part 11 being formed between the two shell parts 9, 10. Here, the shell parts 9, 10, are disposed concentrically to one another, for example, as is also shown above in the example of embodiment in FIG. 2.

The structural part 11 in this embodiment of the invention has an auxetic structure, as is shown in FIG. 3. An example of such an auxetic structure is shown here in the enlarged excerpt in FIG. 3. The auxetic structure is a structure with a negative Poisson number. Preferably, the auxetic structure is radially aligned between the shell parts 9, 10, so that it always acts in the direction of the principal load or substantially in this direction. The direction of the principal load acts in the radial direction in the case of containment or for collecting rotating structural elements or parts thereof, and is indicated by an arrow in FIG. 3. The auxetic structure shown in FIG. 3 is an auxetic honeycomb structure, for example.

Figure 4:
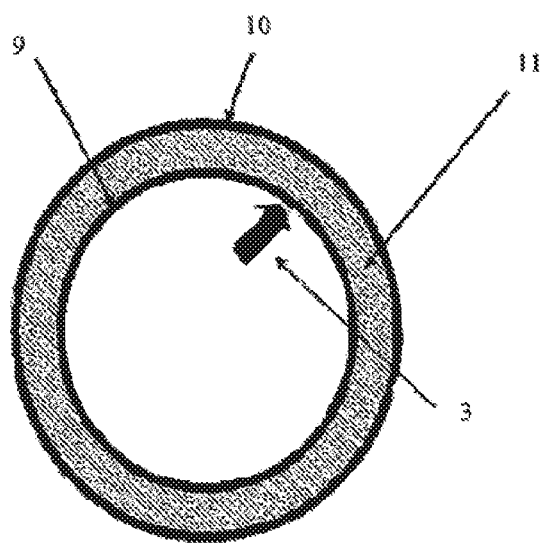
FIG. 4 shows a sectional view of a variant of the housing according to the invention according to FIG. 2.

In addition, in FIG. 4, a sectional view is shown of another embodiment of a housing 3 according to the invention, wherein the housing 3 according to FIG. 4 is distinguished here from the housing 3 according to FIGS. 2 and 3 only in that the structural part 11 has a foam structure that can be formed as auxetic or also as non-auxetic.

The housing 3 also has outer and inner shell part 10, 9, in particular a solid outer shell part and a solid inner shell part, which are disposed concentrically to one another, for example, the structural part 11 being formed between the two shell parts 9, 10. The foam structure as the structural part 11 between the two shell parts 9, 10 is preferably disposed in such a way that it acts in the containment direction or substantially in the containment direction, i.e., here in the radial direction. The containment direction in this case is the direction in which a rotating structural element or a part of such an element moves, after it has been broken off or has been detached in another way.

Figure 5:
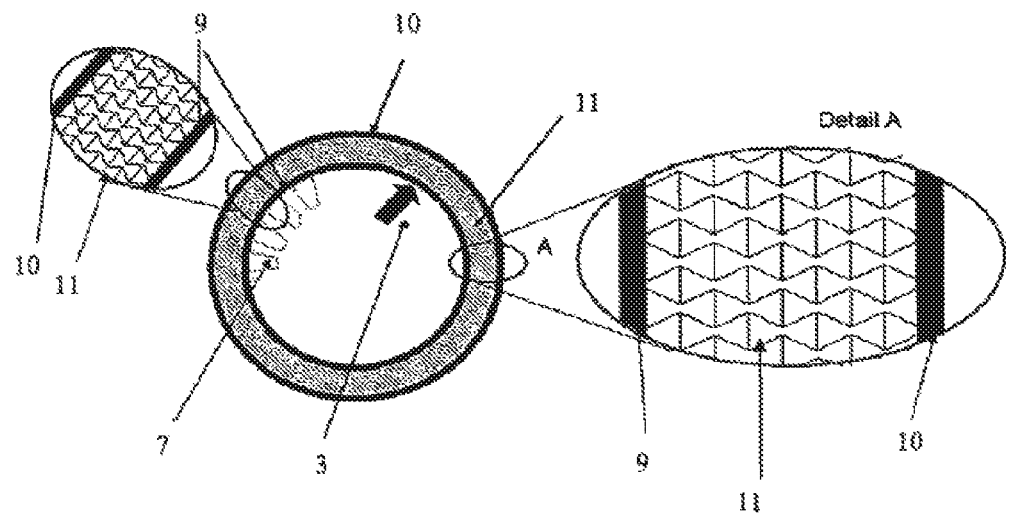
FIG. 5 shows a sectional view of another housing according to the invention.

In addition, a sectional view of another example of embodiment of a housing 3 is shown in FIG. 5. In this case also, the housing 3 has an inner shell part 9 and an outer shell part 10, in particular a solid inner shell part and a solid outer shell part, between which is formed a structural part 11. The structural part 11 in this case is also a honeycomb structure, in particular an auxetic structure. As is shown in the two enlarged excerpts in FIG. 5, the auxetic structure is disposed, for example, so that it acts in the containment direction, or here, in the radial direction. The two shell parts 9, 10 are disposed concentrically to one another, for example, in the example of embodiment as it is shown in FIG. 5.

Such a housing 3, as it is shown, e.g., in FIG. 5, can be formed as an engine housing, for example, whereby in this case, the structural forces of the engine will then be guided over the outer shell part 10. The inner shell part 9 in turn serves for fixing the guide vanes 7, for example, and for defining the annular space contour, within which the working medium, in particular air, is guided and performs work. The guide vanes 7 in this case can be formed in one piece with the inner shell part 9 within the scope of the generative manufacturing method for the production of the housing 3. Likewise, the guide vanes 7 can also be fastened as separate parts to the inner shell part 9.

Figure 6:
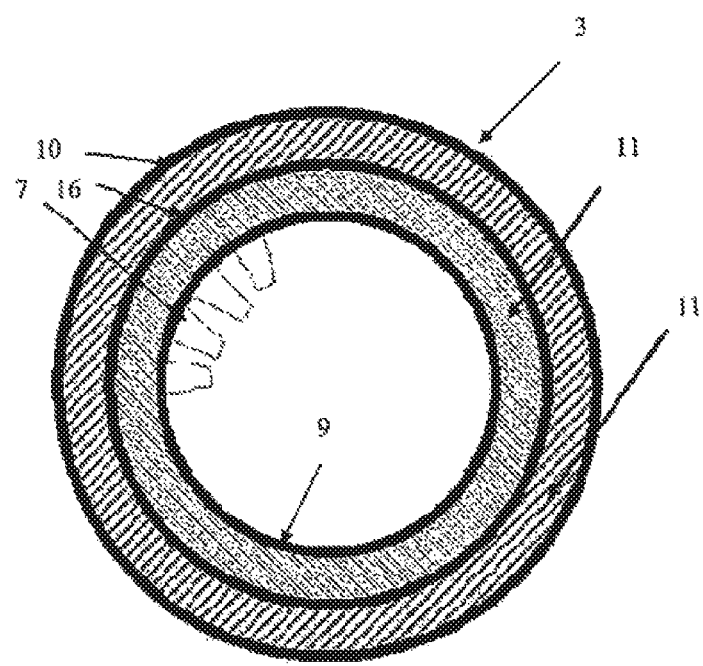
FIG. 6 shows a sectional view of another embodiment of the housing according to the invention.

Another embodiment of a housing 3 according to the invention is shown in FIG. 6. The housing 3 here has more than two shell parts, for example, three shell parts, i.e., an inner shell part 9, at least one intermediate shell part 16, and an outer shell part 10. The shell parts, 9, 10, 16 in this case are formed solid, in particular. In the case of an engine housing, optional blade elements, such as, e.g., guide vanes 7 can also be formed or fastened on the inside of the inner shell part 9.

As shown in FIG. 6, a first structural part 11 is formed between the inner shell part 9 and the intermediate shell part 16, and a second structural part 11 is formed between the intermediate shell part 16 and the outer shell part 10. One or both structural parts 11 may have the same structure or the same combination of structures. Likewise, one or both structural parts 11 can have different structures or different combinations of structures. As the structure or structures, at least one of the structural parts 11 can have a honeycomb structure and/or a porous structure, such as, e.g., a foam structure. The honeycomb structure and/or the porous structure, such as, e.g., the foam structure, in this case can be an auxetic structure or a non-auxetic structure.

In the example of embodiment illustrated in FIG. 6, each of the two structural parts 11 are auxetic structures, for example. Whereby the first auxetic structure or the first structural part 11 between the inner shell part 9 and the intermediate shell part 16, for example, has the same spatial alignment as or a different spatial alignment than the second auxetic structure or the second structural part 11 between the intermediate shell part 16 and the outer shell part 10.

Each of the structural parts 11 can have a structure, e.g., an auxetic structure such as an auxetic honeycomb or foam structure. Likewise, each of the structural parts 11 may have a combination of at least two structures, for example, a combination of a porous structure, e.g., a foam structure, and a honeycomb structure or a combination of two different porous structures or two different honeycomb structures, etc. In this case, the structures may also be auxetic or non-auxetic structures.

An additional, e.g., porous or foam-type (e.g., open-pore or closed pore) structural part 11 (intermediate layer), which can be formed, for example, also as a non-auxetic structure instead of as an auxetic structure, can be used in addition to an auxetic structural part 11 for the purpose of improving and optimally configuring the heat conduction in the housing 3, the total rigidity, and/or the damping behavior of the housing 3. The housing 3 with its at least two or three shell parts 9, 10, 16, and preferably at least one auxetic structural part 11 and alternatively at least one auxetic or non-auxetic structural part 11 is produced integrally by means of a generative manufacturing method, such as, e.g., the previously described laser sintering or electron beam sintering, etc. Also, the microstructure or auxetic structure between two shell parts 9, 10 can be produced in particular with the generative manufacturing method. As has been described previously, the auxetic structure or the auxetic structural part 11 is formed between two shell parts 9, 10 in such a way that it is radially aligned so that it acts in the direction of the principal load.

The formation of a housing 3 having at least two shell parts 9, 10 and a structural part 11 therebetween can be produced integrally as a composite structure only with a generative manufacturing method. This construction made of at least two shell parts 9, 10 and a structural part 11 formed therebetween is suitable for all components of an engine, in which rotating structural elements are found inside a housing, in particular, for a fan housing, a compressor housing, and a turbine housing.

The construction is equally suitable for aircraft engines, stationary gas turbines, aircraft turbines and gas turbines of ships.

By the provision, e.g., of at least one auxetic structure as the structural part 11 between two shell parts 9, 10 of a housing 3, a better resistance to break-through can be achieved, in particular for rotating structural elements that become detached inside the housing (containment), with a simultaneously reduced weight of the housing 3 when compared with the conventional construction. In addition, the rigidity of the housing 3 can be influenced in a targeted manner by means of an auxetic structural part 11, and a damping of the housing 3 can be increased. Therefore, the necessary housing weight can be reduced overall, particularly for rapidly running engines.

With further structural parts 11 or a structural part 11 having several structures, such as, e.g., a combination of an auxetic, porous structure and a non-auxetic foam-type structure, one can improve the heat insulation of the housing 3. This makes the housing 3 a thermal support, which positively affects the behavior of the radial gap (and thus the efficiency and the stability of the components or of the engine) of a rotor-stator system.

In addition, heat conduction to an outer shell part can simultaneously be prevented by an additional second structural part 11 in the case of more than two shell parts 9, 10, for example in the form of an auxetic or non-auxetic foam structure or honeycomb structure, and the strength can be improved thereby.

Figure 7:
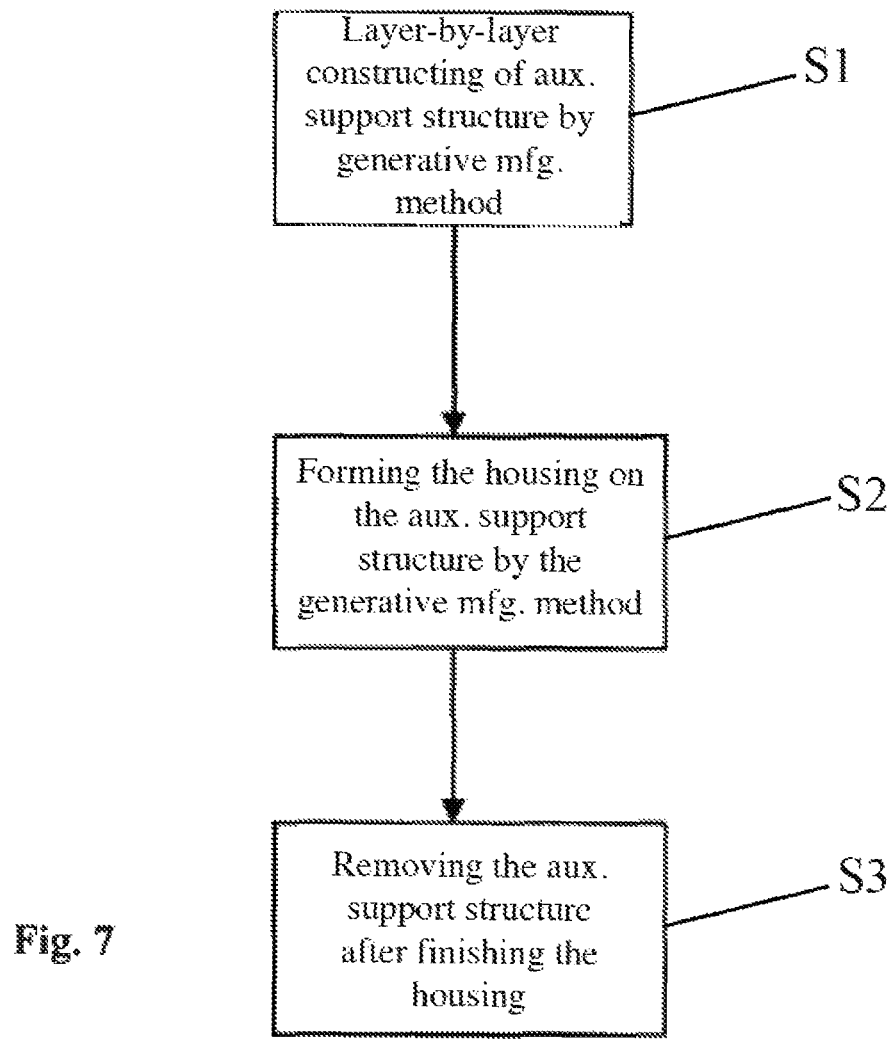
FIG. 7 shows a flow chart for the production of a housing according to the invention.

A flow chart for producing, repairing and/or exchanging a housing according to the invention, which has at least two shell parts and a structural part formed between the two shell parts, is shown in FIG. 7. Examples of such a housing are shown in FIGS. 1 to 6.

The auxiliary structure of the component is formed first in a first step S1. For forming the auxiliary structure, a powder layer is applied onto a base plate and subsequently an auxiliary structure region of the powder layer is solidified by means of suitable energy radiation from an energy radiation source, e.g., a laser. Subsequently, the base plate is moved, e.g., lowered, by one layer thickness and the next powder layer is applied onto the previous powder layer, and the auxiliary structure region of this powder layer is solidified by means of the energy radiation. The step S1 is repeated until the auxiliary structure is produced.

Subsequently, in a step S2, the actual component is formed, here the housing with its at least two shell parts and the structural part between the two shell parts, as well as, optionally, an upper terminal part and/or a lower terminal part. For this purpose, a new powder layer is introduced onto the last solidified powder layer and the new powder layer is solidified in a component region by means of suitable energy radiation from an energy radiation source, e.g., a laser. Subsequently, the base plate is moved, e.g., lowered, by one layer thickness, and the next powder layer is applied onto the previous powder layer, and the component region of this powder layer is solidified by means of the energy radiation. The step S2 is repeated until the housing is completely produced from the solidified component regions.

Subsequently, in step S3, the unsolidified powder is removed and the support structure is removed from the housing.

In addition to a complete production of the housing, a residual portion of a housing can likewise be completed or added to an already existing part of a housing, e.g., in the scope of a repair or an addition.

In addition, step S1 for the production of an auxiliary support structure is optional.

Although the present invention was described in the foregoing based on preferred embodiment examples, it is not limited thereto, but can be modified in many different ways. In particular, the above-described embodiment examples, particularly individual features thereof, can be combined with one another.

The invention claimed is:

1. A method for producing a component, comprising:
   layer-by-layer constructing a housing of an aircraft engine, the housing having an inner shell part and an outer shell part together with a structural part therebetween, by a generative manufacturing method, wherein the generative manufacturing method comprises applying a powder layer and solidifying the powder layer by energy radiation, wherein the structural part has at least one porous structure and/or one honeycomb structure, wherein the step of the layer-by-layer constructing further comprises:
   layer-by-layer constructing an auxiliary support structure by the generative manufacturing method on a base plate;
   subsequently forming the housing on the auxiliary support structure by the generative manufacturing method, wherein the auxiliary support structure and housing are integrally connected; and
   removing the auxiliary support structure from the housing after finishing the housing.

2. The method according to claim 1, wherein the step of the layer-by-layer constructing further comprises the step of forming at least one shell part as a shell part with solid walls.

3. The method according to claim 1, wherein the at least one porous structure and/or one honeycomb structure is formed as an auxetic structure and the porous structure is formed as a foam structure.

4. The method according to claim 3, wherein the auxetic structure is aligned in a direction of a principal load of the housing.

5. The method according to claim 1, wherein the step of layer-by-layer constructing further comprises the step of forming the housing with at least one intermediate shell part between the outer shell part and the inner shell part, wherein a first structural part is formed between the inner shell part and the intermediate shell part, and a second structural part is formed between the intermediate shell part and the outer shell part.

6. The method according to claim 5, wherein the first and second structural parts have the same structure or the same combination of structures.

7. The method according to claim 1, wherein the step of layer-by-layer constructing further comprises the step of forming the housing with a terminal part on at least one end.

8. An engine housing, comprising an inner shell part, an outer shell part and a structural part formed between the inner and outer shell parts, and lower and upper terminal parts enclosing the structural part within the inner and outer shell parts, wherein the engine housing is produced by a generative manufacturing method and the structural part has at least one porous structure and/or one honeycomb structure, wherein the generative manufacturing method of the housing comprises:
  layer-by-layer constructing an auxiliary support structure by the generative manufacturing method on a base plate;
  subsequently forming the housing on the auxiliary support structure by the generative manufacturing method, wherein the auxiliary support structure and housing are integrally connected; and
  removing the auxiliary support structure from the housing after finishing the housing.

9. The engine housing according to claim 8, wherein the porous structure and/or the honeycomb structure is formed as an auxetic structure.

10. The engine housing according to claim 9, wherein the porous structure is a foam structure.

11. The engine housing according to claim 8, wherein at least one shell part is produced from metal, a metal alloy, and/or ceramics.

12. A method for producing an engine housing of an aircraft engine, the housing having an inner shell part and an outer shell part, between which a structural part is formed, and a plurality of guide vanes extending radially inward from the inner shell part, comprising the step of:
  layer-by-layer constructing the inner and outer shell parts together with the structural part and the plurality of guide vanes by a generative manufacturing method, wherein the structural part has at least one porous structure and/or one honeycomb structure, wherein the generative manufacturing method comprises applying a powder layer and solidifying the powder layer by energy radiation.

13. The method of claim 12, wherein the generative manufacturing method of the housing comprises the steps of:
  layer-by-layer constructing an auxiliary support structure by the generative manufacturing method by applying a powder layer to a base plate and subsequently to an auxiliary support structure, wherein the powder layer is solidified by energy radiation;
  subsequently forming the housing on the auxiliary support structure by the generative manufacturing method, wherein the auxiliary support structure and housing are integrally connected; and
  removing the auxiliary support structure from the housing after finishing the housing.

14. The method according to claim 12, wherein the porous structure and/or honeycomb structure is formed as an auxetic structure, and the porous structure is formed as a foam structure.

15. The method according to claim 14, wherein the auxetic structure is aligned in a direction of a principal load of the housing.

16. The method according to claim 12, wherein the step of layer-by-layer constructing further comprises the step of forming the housing with at least one intermediate shell part between the outer shell part and the inner shell part, wherein a first structural part is formed between the inner shell part and the intermediate shell part, and a second structural part is formed between the intermediate shell part and the outer shell part.

17. The method according to claim 12, wherein the step of layer-by-layer constructing further comprises the step of forming the housing with a terminal part on at least one end.

18. The method according to claim 16, wherein the first and second structural parts have the same structure or the same combination of structures.

19. The method according to claim 12, wherein the step of the layer-by-layer constructing further comprises the step of forming at least one shell part as a shell part with solid walls.

20. A method for manufacturing an engine housing of an aircraft engine, the engine housing having an inner shell part and an outer shell part, between which a structural part is formed, comprising the step of:
  layer-by-layer constructing the inner and outer shell parts together with the structural part by a generative manufacturing method, wherein the generative manufacturing method comprises applying a powder layer and solidifying the powder layer by energy radiation, wherein the structural part is an auxetic structure.

21. The method according to claim 20, further comprising the steps of:
  layer-by-layer of an auxiliary support structure by a generative manufacturing method;
  subsequently forming the housing on the auxiliary support structure by the generative manufacturing method; and
  removing the auxiliary support structure from the housing after finishing the housing.

22. The method according to claim 20, wherein the step of the layer-by-layer constructing further comprises the step of forming at least one shell part as a shell part with solid walls.

23. The method according to claim 20, wherein the auxetic structure is aligned in a direction of a principal load of the housing.

24. The method according to claim 20, wherein the step of layer-by-layer constructing further comprises the step of forming the housing with at least one intermediate shell part between the outer shell part and the inner shell part, wherein a first structural part is formed between the inner shell part and the intermediate shell part, and a second structural part is formed between the intermediate shell part and the outer shell part.

25. The method according to claim 20, wherein the step of layer-by-layer constructing further comprises the step of forming the housing with a terminal part on at least one end.

26. The method according to claim 24, wherein the first and second structural parts have the same structure or the same combination of structures.

* * * * *